United States Patent [19]

Messmer et al.

[11] 3,823,384
[45] July 9, 1974

[54] WARNING BLINKER

[76] Inventors: Hubert Messmer, Drosselweg 11, 7778 Markdorf; Walter Monnerjahn, Maizer Strasse 89; Werner Rudolph, Graber Strasse 39, both of 6509 Gau-Oderheim, all of Germany

[22] Filed: Sept. 8, 1972

[21] Appl. No.: 287,440

[30] Foreign Application Priority Data
Sept. 9, 1971  Germany............... 21146

[52] U.S. Cl............. 340/84, 240/8.18, 340/90, 340/114 B
[51] Int. Cl............................. B60q 1/26
[58] Field of Search............ 340/84, 114 B, 90; 240/8.18

[56] References Cited
UNITED STATES PATENTS

| | | | |
|---|---|---|---|
| 814,065 | 3/1906 | Mulry | 240/8.18 X |
| 982,651 | 1/1911 | Wellman | 240/8.18 X |
| 1,693,936 | 12/1928 | Paddack et al. | 240/8.18 |
| 2,496,618 | 2/1950 | Cox et al. | 340/90 |
| 2,753,443 | 2/1950 | Grohsgal | 240/8.18 X |
| 2,878,462 | 3/1959 | Tralli | 340/107 |
| 2,894,257 | 7/1959 | Crooks | 340/90 |
| 2,949,531 | 8/1960 | Lemelson | 340/114 B X |
| 2,981,828 | 4/1961 | Worden | 240/8.18 |
| 2,997,573 | 8/1961 | Nyborg | 240/8.18 |
| 3,622,979 | 11/1971 | Dickerson | 340/321 X |

FOREIGN PATENTS OR APPLICATIONS

| | | | |
|---|---|---|---|
| 944,899 | 11/1948 | France | 240/8.18 |
| 705,415 | 4/1941 | Germany | 240/8.18 |
| 338,678 | 11/1930 | Great Britain | 240/8.18 |
| 990,705 | 4/1965 | Great Britain | 240/52.15 |

*Primary Examiner*—Donald J. Yusko
*Attorney, Agent, or Firm*—Webb, Burden, Robinson & Webb

[57] ABSTRACT

A portable warning light for motor vehicles is adapted to be connected to the vehicle electrical supply. The light is comprised of two parts. One part comprises a hand hold, an electric lamp, an electric cable and wind-up reel. The other part comprises a housing, which when the light is not in use, completely encloses the lamp and the cable reel. When the lamp is in use, the other part receives the handle to hold the lamp in an elevated position.

5 Claims, 3 Drawing Figures

PATENTED JUL 9 1974  3,823,384
Fig. 1
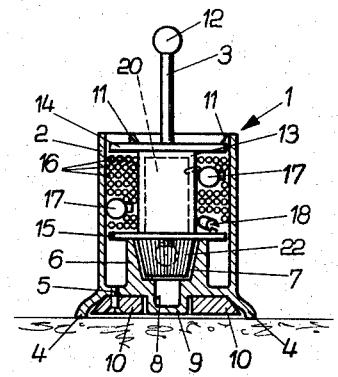
Fig. 3
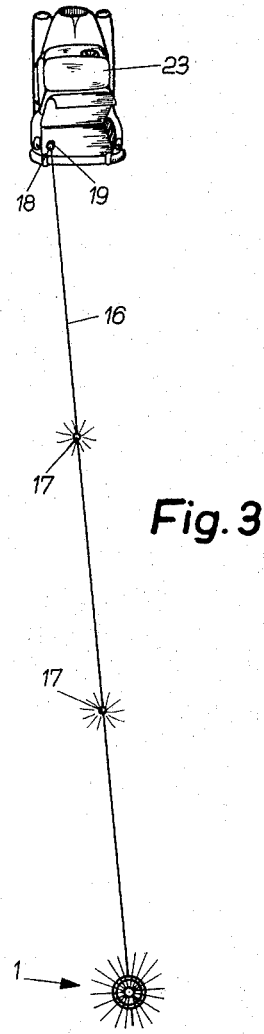
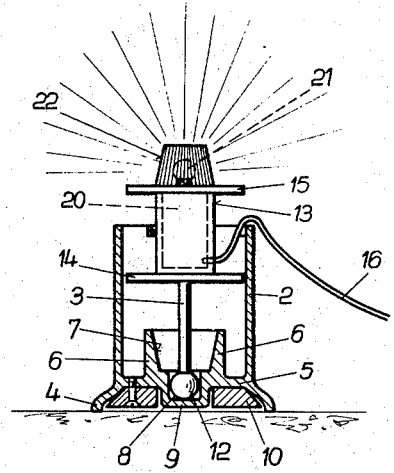
Fig. 2

WARNING BLINKER

Portable electric warning blinkers for automotive vehicles powered by an electric battery are known. Such warning blinkers are intended to be used in the event of an automobile accident at some distance from the scene of the accident so that the rest of the moving traffic can be made aware of the accident. However, it has been found that the battery operated warning blinkers carried by the driver lose their usefulness after a certain period of time because the batteries lose their charge and deliver no current or insufficient current. Since most automobile drivers only very rarely have accidents, the warning blinkers are subject to long periods of idleness during which the battery runs down. Consequently, the very unfortunate situation may arise that the warning blinker battery will not deliver any current just when it is needed in the event of an accident.

It is an advantage of this invention to provide a dependable electric warning blinker.

According to this invention, in a portable electric warning blinker for automotive vehicles, an electric cable connects the warning blinker to the battery of the vehicle. The warning blinker has a flanged spool-like member for winding up the cable. A housing is provided into which the warning blinker can be inserted in two positions; that is, with the bulb concealed or with the bulb visible. The flanged winding spool may be provided with a handle. The handle suitably consists of an axially running rod whose free end may be inserted into a recess in the floor of the housing.

Preferably, an electrical or electro-mechanically operating flashing relay is housed in the flanged winding spool. One or more warning blinkers may be hooked up at regular intervals in the cable. Furthermore, the floor of the housing preferably has a projection which protrudes into the interior for supporting the flanged winding spool as well as a recess for receiving the shade for the bulb. The housing may be releasably connected to the warning blinker by means of an elastically resilient spring clip. In order to reduce the cross-section of the cable, the latter may have a plug with a built-in flashing relay. It is advantageous to have a separate additional part in the form of a socket box with connecting clamps for the automobile battery terminals.

Further features and other objects and advantages will become apparent from the following detailed description made with reference to the drawings in which:

FIG. 1 is a longitudinal section through the warning blinker in the stored position;

FIG. 2 is a longitudinal section through the warning blinker in the operative position; and, FIG. 3 is a plan view of the scene of an accident with the blinker lights set up in place.

The warning blinker shown in the drawings consists basically of two parts which can be inserted into one another. One part comprises a flanged winding spool 13, 14 and 15 with an electric cable 16 wound thereon and with warning blinker lights 17 connected in circuit therewith, as well as a plug 18 connected thereto which may, for example, be plugged into socket box 19 provided, for example, in the trunk of an automotive vehicle 23.

A housing 2 is provided to hold the cable spool 13, 14 and 15 and warning blinker 1 in either of two positions; that is, stored or operative. The housing may be coated with a refractive material.

Socket box 19 may, however, be installed on the dashboard of the vehicle. The connection may be made directly to the battery by the socket box having connecting clamps for the terminals of the automobile battery.

Bulb 21 protected by a shade 22 projects from the free end of spool flange 15, while from the opposite side of spool flange 14 a rod-shaped axial handle 3 projects which is insertable by means of its thickened knob end 12 into a recess 8 in the housing floor 5. Recess 8 may be formed by a suitable projection 9 in housing floor 5.

Housing floor 5 is also provided with a widened annular base 4 under which a weight disk 10 may be secured for the purpose of increasing the stability.

Housing floor 5 also has an inwardly protruding projection 6 with a larger recess 7 for receiving the lamp shade 22. When warning blinker 1 is in the inoperative position, spool flange 15 rests on the projection 6 of housing floor 5. The winding flanged spool is held in its inoperative position by suitable elastically resilient spring clips 11 on the inside of the housing wall.

A flashing relay 20 is housed in the flanged winding spool and for practical purposes in the cylindrical center portion 13 of the flanged spool.

In a modified embodiment not shown in the drawings, a flashing relay of particularly small construction may already be built into plug 18 so that the cross-section of the conducting wire of cable 16 may be reduced correspondingly to the reduced load.

According to a preferred embodiment, the shade is arranged to be removed and a switch is provided to by pass the flashing relay such that the lamp may be used as a working light.

A major advantage of the described warning blinker is to be found in the fact that the blinker is ready for use even after extended periods of rest, since the automobile battery always supplies sufficient current as long as the vehicle can be driven at all.

A further advantage resides in that with proper circuitry, when a blinker bulb 17 is eliminated, the others will continue to flash.

Having thus described the invention with the detail and particularity as required by the Patent Laws, what is desired protected by Letters Patent is set forth in the following claims.

We claim:

1. A portable warning light for motor vehicles which is connectable to the battery of the vehicle by means of an electric cable, characterized by two parts which are inserted differently into one another when in use and when not in use, the one part comprising a hand hold and an electric bulb with a cable wind-up reel and cable disposed therebetween, and the other part consisting of a cylindrical housing which when not in use completely encloses only the lamp and the winding-reel, and when in use completely encloses only the hand hold.

2. A warning blinker according to claim 1, characterized by the fact that the housing bottom (5) has a projection (6) which extends into the inside chamber and has a recess (7) for receiving the lamp shade (22).

3. A warning blinker according to claim 2 characterized by the fact that in the housing bottom (5) a recess (8) is provided for securing the free end of the hand hold.(3)

4. A warning blinker according to claim 3 characterized by the fact that the cable wind-up reel (13–15) is connected to the housing (2) in a readily releasable manner by elastically resilient clips (11).

5. A warning blinker according to claim 4 characterized by the fact that one or more warning blinker lights (1) are inserted at regular intervals in the connecting cable (16).

* * * * *

UNITED STATES PATENT OFFICE
CERTIFICATE OF CORRECTION

Patent No. 3,823,384          Dated July 9, 1974

Inventor(s) Hubert Messmer et al.

It is certified that error appears in the above-identified patent and that said Letters Patent are hereby corrected as shown below:

In the line listing the Foreign Application Priority Data:

--21146-- should read -- P 21 45 146.7--.

Signed and sealed this 29th day of October 1974.

(SEAL)
Attest:

McCOY M. GIBSON JR.
Attesting Officer

C. MARSHALL DANN
Commissioner of Patents